United States Patent
Kawase et al.

[11] Patent Number: 5,948,563
[45] Date of Patent: Sep. 7, 1999

[54] SEALED

[75] Inventors: Hiroshi Kawase, Kariya; Shinya Morishita, Nagoya; Shinichi Towata, Nagoya; Kenichi Suzuki, Nagoya; Katsushi Abe, Aichi-ken, all of Japan

[73] Assignee: Kabushiki Kaisha Toyoda Jidoshokki Seisakusho, Kariya, Aichi-ken, Japan

[21] Appl. No.: 08/696,494

[22] Filed: Aug. 14, 1996

[30] Foreign Application Priority Data

Aug. 16, 1995 [JP] Japan .................................. 7-208813

[51] Int. Cl.⁶ ...................................................... H01M 4/52
[52] U.S. Cl. ........................................ 429/218.2; 429/223
[58] Field of Search ..................................... 429/217, 212, 429/101, 206, 223; 420/900

[56] References Cited

U.S. PATENT DOCUMENTS

| | | | |
|---|---|---|---|
| 5,100,747 | 3/1992 | Hayashida et al. | 429/101 |
| 5,514,488 | 5/1996 | Hake et al. | 429/217 X |
| 5,514,492 | 5/1996 | Marincic et al. | 429/217 X |
| 5,525,444 | 6/1996 | Ito et al. | 429/206 |
| 5,527,638 | 6/1996 | Kinoshita et al. | 429/101 |
| 5,707,759 | 1/1998 | Simon et al. | 429/217 |

FOREIGN PATENT DOCUMENTS

| | | |
|---|---|---|
| 52-8434 | 1/1977 | Japan . |
| 52-98939 | 8/1977 | Japan . |
| 56-167270 | 12/1981 | Japan . |
| 63-245859 | 10/1988 | Japan . |

*Primary Examiner*—Maria Nuzzolillo
*Assistant Examiner*—Mark Ruthkosky
*Attorney, Agent, or Firm*—Morgan & Finnegan, L.L.P.

[57] ABSTRACT

An electrode for a sealed nickel/metal hydride battery and a method of manufacturing the same, which is capable of suppressing a decrease in the charging reserve of a hydrogen-storage alloy electrode (negative electrode) and an increase in the internal pressure of the battery, is provided. The hydrogen-storage alloy electrode is formed using a tackifier or a binder which is prepared from an organic polymer material containing the ether linkage (—O—), for example, polyethylene oxide, polypropylene oxide, or polybutylene oxide. The specified material is suitably hydrophilic, and it exhibits an oxidation resistance which is much higher than that of a conventional material containing the hydroxyl group (—OH). Therefore, the specified material is especially resistant to oxidation and decomposition at the positive electrode of the battery and can significantly reduce the production of hydrogen attributed to the oxidation and decomposition.

19 Claims, 4 Drawing Sheets

$R = C_m H_{2m+1}$  ($n \geq 10$, $m = 8 \sim 12$)

$R = C_m H_{2m+1}$  ($n \geq 10$, $m = 12 \sim 18$)

SEALED

BACKGROUND OF THE INVENTION

1. Field of the Invention

The present invention relates to a hydrogen storage alloy electrode for a sealed nickel/metal hydride battery and a method of manufacturing the same. More specifically, it relates to the suppression of a decrease in the charging reserve of the hydrogen-storage alloy electrode of the sealed nickel/metal hydride battery.

2. Description of the Prior Art

Recently, the demand for an alkali storage battery for use in an electric vehicle and the like is increasing high. Especially, an alkali storage battery attracts attention as a power source for an electric vehicle and the like, because a nickel/metal hydride battery has a large energy capacity, using a hydrogen-storage alloy electrode as a negative electrode and a nickel hydroxide electrode as a positive electrode.

Such a prior-art nickel/metal hydride battery in which a negative electrode is an electrode made of a hydrogen-storage alloy, is constructed as a so-called "positive electrode-regulated battery" by designing the theoretical capacity of the positive electrode to be smaller than that of the negative electrode, as illustrated in FIG. 1. This construction is based on the intention of causing the negative electrode to absorb oxygen produced by the positive electrode at the end of charging, and simultaneously securing a charging reserve (a chargeable surplus capacity component) Pc, whereby the production of hydrogen on the negative electrode side is reduced to prevent the internal pressure of the battery from rising, and the negative electrode is endowed with a discharging reserve (a dischargeable surplus capacity component) Pd to enlarge the effective discharge area of the negative electrode for the discharging mode of the battery. In the prior art, therefore, the theoretical capacity of the negative electrode is usually designed to be at least about 1.6 times as large as that of the positive electrode.

Meanwhile, the hydrogen-storage alloy electrode is formed in such a way that the powder of the hydrogen-storage alloy is first turned into a paste by mixing it with water and a tackifier or a binder whose raw material is an organic polymer material, and that the paste is subsequently packed into a metallic collector member made of, for example, a porous foamed-nickel material. A highly hydrophilic organic polymer material which is also favorable for the formation of the paste, is most suitable as the organic polymer material which is employed for the tackifier or the binder mentioned above. By way of example, polyvinyl alcohol (PVA), methyl cellulose (MC) or carboxymethyl cellulose (CMC) which contains the hydroxyl group (OH group), which are highly hydrophilic, are usually employed as the tackifier or the binder.

From the results of various experiments, however, the inventors have discovered the occurrence of a problem that the aforementioned organic polymer material containing the OH group oxidizes and decomposes in the positive electrode during the charging of the battery, thereby decreasing the charging reserve, and in turn, incurring the production of hydrogen from the negative electrode at the end of the charging cycle and raising the internal pressure of the battery. Incidentally, an increase in the internal pressure of a sealed nickel/metal hydride battery causes the problem of shortening the charging cycles lifetime of the battery, resulting in operation of the safety valve thereof.

SUMMARY OF THE INVENTION

The present invention has been made in consideration of the above problems. Specifically, its object is to provide an electrode for a sealed nickel/metal hydride battery, which is capable of suppressing any decrease in the charging reserve of a hydrogen-storage alloy electrode (negative electrode), and any increase in the internal pressure of the battery, and also a method of manufacturing the electrode.

The first aspect of the present invention consists of an electrode for a sealed nickel/metal hydride battery, fabricated by immersing in an alkaline electrolyte a hydrogen-storage alloy electrode, in which a paste formed by mixing the powder of a hydrogen-storage alloy with a tackifier and water is deposited into a metallic collector member and which is enclosed in a sealing case; characterized in that the tackifier is formed from a raw material which is a nonionic and water-soluble organic polymer material containing an ether linkage.

The second aspect of the present invention is that the tackifier explained in the above first aspect is changed to a binder.

Furthermore, the tackifier or the binder may well be mixed with the powder of the active material, after being mixed with water or dissolved in water beforehand.

In another aspect of the present invention, the first aspect or the second aspect explained above is further characterized in that said organic polymer material is one selected from the group consisting of alkylaryl ether, alkyl ether, and a copolymer of them.

Namely, an organic polymer material containing the ether linkage (—O—) (for example, polyethylene oxide, polypropylene oxide or polybutylene oxide) is suitably hydrophilic, and exhibits an oxidation resistance which is far superior to that of a conventional material containing the hydroxyl group (—OH).

Therefore, the material specified above is particularly resistant to oxidation and decomposition at the positive electrode of the battery, and can significantly suppress the decrease in magnitude of the charging reserve attributed to oxidation and decomposition. Accordingly it is possible to prevent a decrease in the charging reserve of the negative electrode, rise of the internal pressure of the battery, and shortening of the charging cycles lifetime of the battery, all of which are caused by the oxidation and decomposition of the tackifier or the binder.

In another aspect of the present invention, the first aspect or the second aspect explained above is further characterized in that each of the tackifier or binder contains as its principal component a material which is selected from the group consisting of polyethylene oxide, polypropylene oxide, polybutylene oxide, and a copolymer of at least two of them.

Incidentally, the polyethylene oxide, polypropylene oxide or polybutylene oxide which is exemplified as a nonionic and water-soluble organic polymer material containing an ether linkage, should preferably have a degree of polymerization of at least 5000, and more preferably should have the degree of polymerization of at least 20,000. When the degree of polymerization is less than 5000, the material is susceptible to electrochemical oxidation. When the degree of polymerization is 20,000 or above, the amount of the tackifier or the binder to be added can be decreased, and the number of the OH groups becomes relatively smaller, so that the material becomes still more resistant to oxidation.

Another aspect of the present invention consists of a method of manufacturing an electrode for a sealed nickel/metal hydride battery, fabricated by immersing in an alkaline electrolyte a hydrogen-storage alloy electrode, in which a paste formed by mixing powder of a hydrogen-storage alloy with a tackifier (or binder) and water is deposited into a metallic collector member and which is enclosed in a sealing case, comprising the step of containing the tackifier with a nonionic and water-soluble organic polymer material including an ether linkage.

DESCRIPTION OF THE PREFERRED EMBODIMENTS

The preferred aspects of the present invention will be described in conjunction with examples.

In the ensuing description, each of the examples concerns a method of manufacturing a hydrogen-storage alloy electrode according to the present invention.

<EXAMPLE 1>

A hydrogen-storage alloy having a composition of MmNi$_{3.6}$ Co$_{0.75}$ Al$_{0.3}$ Mn$_{0.35}$ (La/Mm=0.6) was machine-pulverized to 150 meshes or less, thereby preparing the powder of the hydrogen-storage alloy. Furthermore, the 2% by weight aqueous solutions of polyethylene oxide (PEO) having a degree of polymerization of about 100,000, polypropylene oxide (PPO) having a degree of polymerization of about 100,000, methyl cellulose (MC) having a degree of polymerization of about 50,000, and polyvinyl alcohol (PVA) having a degree of polymerization of about 2000, were respectively prepared as tackifiers. The tackifiers were individually added to the hydrogen-storage alloy powder to the amounts of 30% by weight based on the weight of the alloy, and each resulting solution was stirred. Thus, four types of pastes containing the different tackifiers were obtained. Subsequently, the four types of pastes were packed into foamed-nickel collector members (each being 550 gr/m$^2$) and were each dried at 70~80° C. The resulting collector members were each pressed by a roll press. Then, hydrogen-storage alloy electrodes each being 0.6 mm thick were formed as negative electrodes.

Further, the aforementioned 2% by weight aqueous solutions of the organic polymer materials and nickel hydroxide were mixed at a weight ratio of 2 to 1. The resulting solutions were packed into foamed-nickel collector members of the same type as those used for the negative electrodes and were dried. Then, each positive electrode was formed.

Next, the positive electrodes and the negative electrodes which contained the identical organic polymer material were wound together in the state in which a separator made of polypropylene was interposed therebetween. Thus, each cylindrical electrode assembly of sub C size was constructed. Cylindrical enclosed batteries were fabricated by immersing each cylindrical electrode assembly in an aqueous solution of 6N-KOH.

Figure 1:
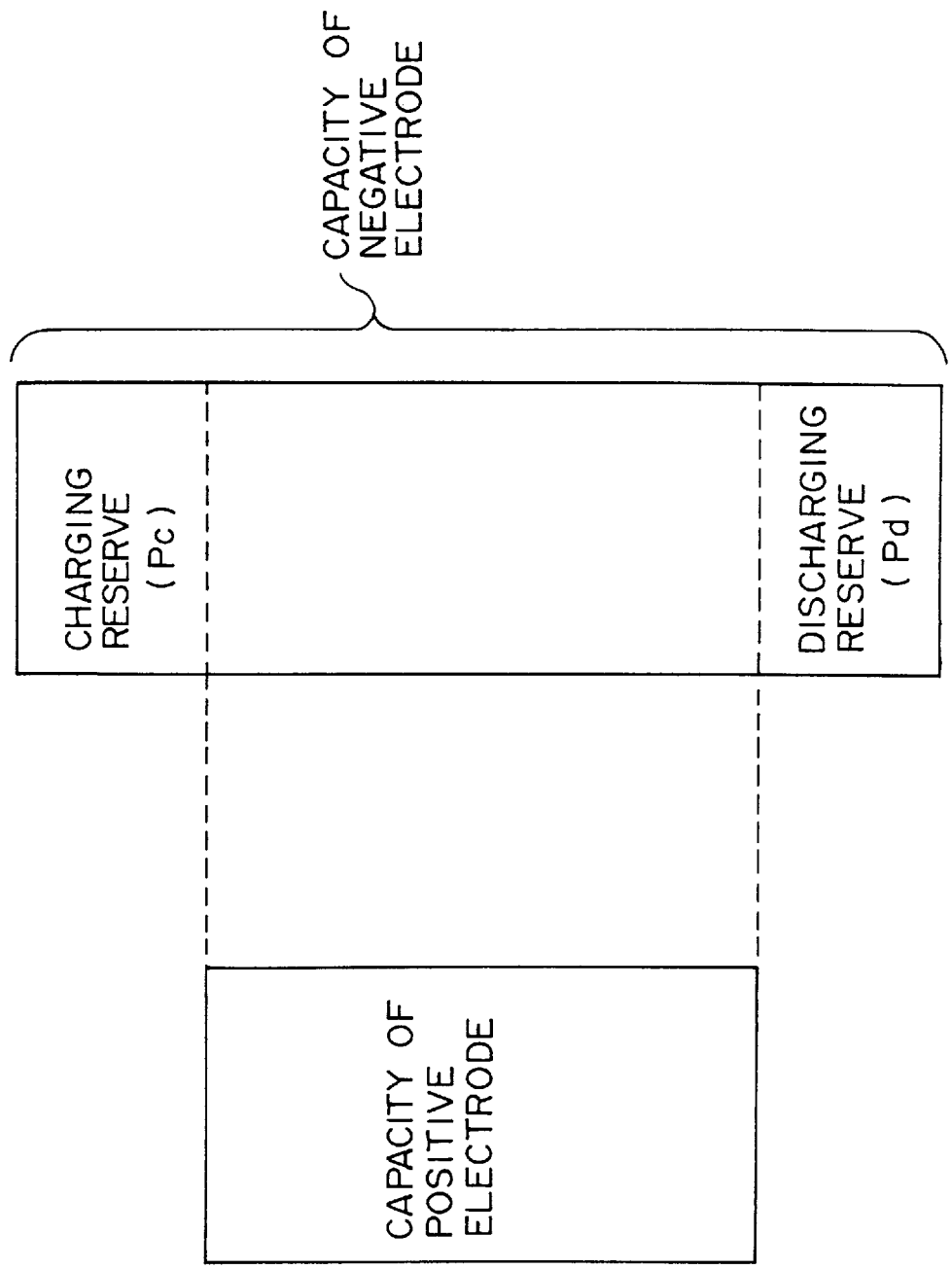
FIG. 1 is a schematic diagram showing the states of a charging reserve and a discharging reserve in a positive electrode-regulated battery which employs a hydrogen-storage alloy electrode as its negative electrode.
Figure 2:
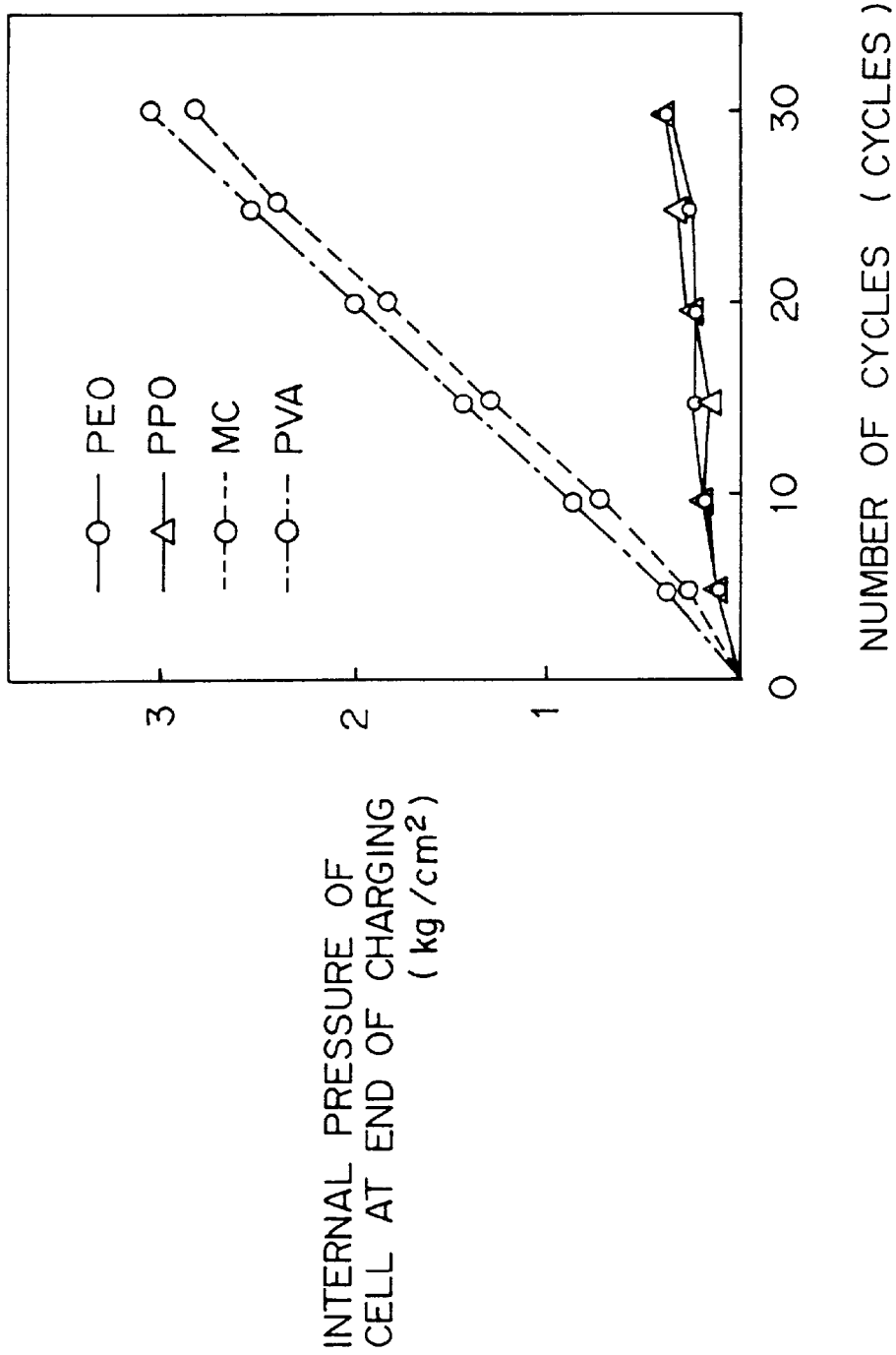
FIG. 2 is a graph showing the change in internal pressure of the sealed nickel/metal hydride batteries which employ tackifiers in examples according to the present invention and in comparative examples.

Each of the four types of battery was subjected to repeated charging-and-discharging cycles by charging the battery for 12 hr. at 0.1 C (capacity) with respect to the theoretical capacity of the positive electrode, and thereafter discharging the battery down to 1.0 V at 0.2 C. On this occasion, the rise in the internal pressure of each battery was determined. The results obtained are illustrated in FIG. 2. Herein, the value of the internal pressure of each type of battery corresponds to the average value of internal pressures measured for ten samples which were fabricated for each type of battery.

It is seen from FIG. 2 that the hydrogen-storage alloy electrode employing the polyethylene oxide(PEO) or the polypropylene oxide(PPO) can suppress the rise in the internal pressure of the battery much better than the hydrogen-storage electrode employing the methyl cellulose (MC) or the polyvinyl alcohol(PVA).

<EXAMPLE 2>

Figure 3:
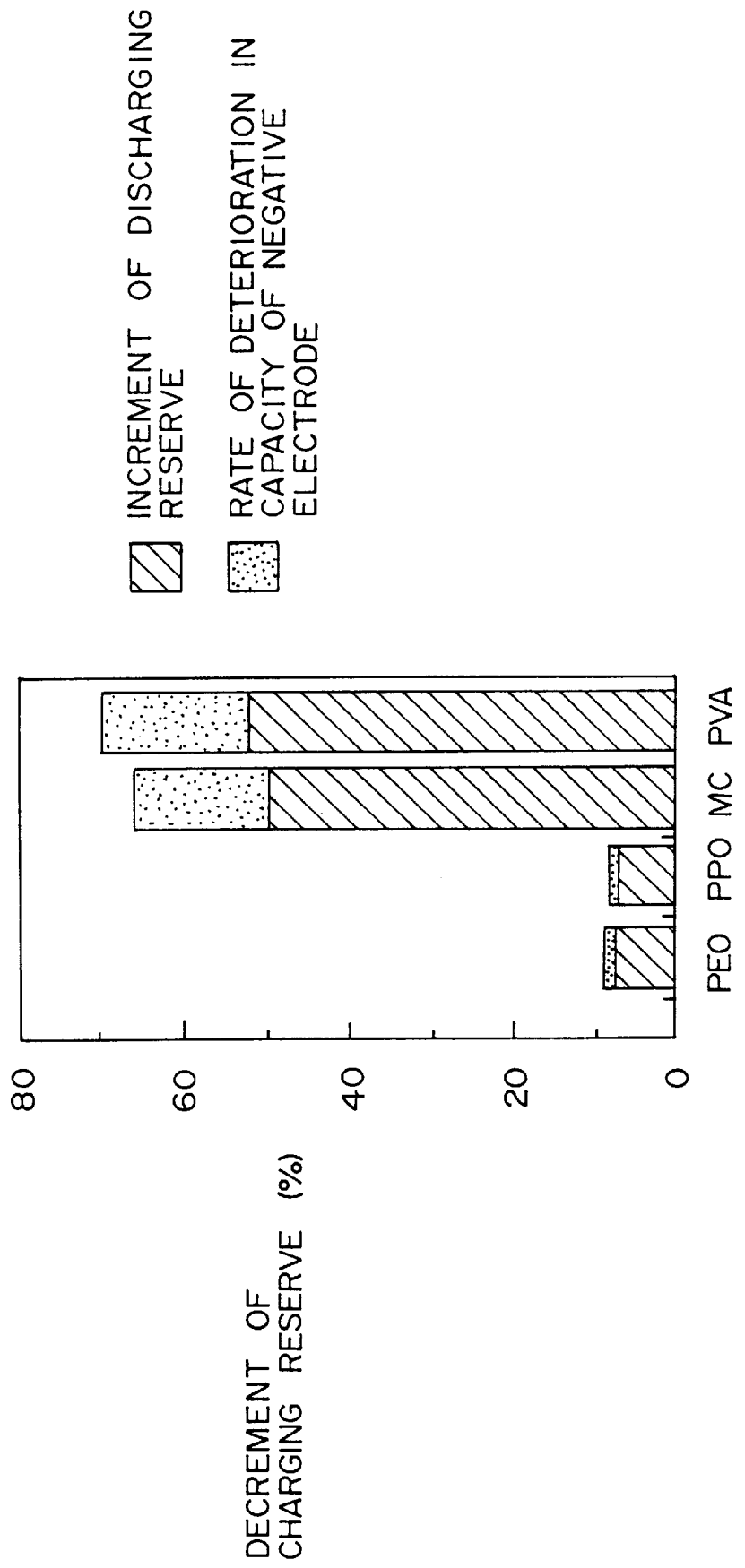
FIG. 3 is a graph showing increments in the discharging reserve and capacity deterioration (i. e., decrements in the charging reserve) of a hydrogen-storage alloy electrode in the sealed nickel/metal hydride batteries which employ the tackifiers in examples according to the present invention and in comparative examples.

At the next stage, each of the types of battery fabricated in Example 1 was subjected to 30 charging-and-discharging cycles. Thereafter they were disassembled, and their hydrogen-storage alloy electrodes were taken out. The charging reserve decrement and the discharging reserve increment of the electrode were determined. The difference between the decrement and the increment corresponds to the time-varying deterioration of the capacity of the negative electrode. The results obtained are illustrated in FIG. 3. Herein, the vertical axis represents the proportion relative to the theoretical capacity of the negative electrode.

It is seen from FIG. 3 that the hydrogen-storage alloy electrodes employing the polyethylene oxide(PEO) or the polypropylene oxide(PPO) can suppress the decrement of the charging reserve of the battery much better than the hydrogen-storage alloy electrode employing the methyl cellulose(MC) or the polyvinyl alcohol(PVA).

Although each of the examples demonstrates the deterioration of the negative electrode of the hydrogen-storage alloy attributed to the oxidation and decomposition of the tackifier in the sealed nickel/metal hydride battery, the oxidation and decomposition of the tackifier arise also on the positive electrode side. Accordingly it is understood that the present invention is also applicable to a sealed nickel/metal hydride battery in which the organic polymer material containing an ether group is employed as the tackifier on only the positive electrode side.

Incidentally, the above description of the embodiments specifically explained about the hydrogen-storage alloy electrode employing polyethylene oxide(PEO) or polypropylene oxide(PPO). However, this invention is not constrained by the above embodiments. It is possible to have an embodiment of this invention using the tackifier or the binder containing the following organic polymer material.

Figure 4A:
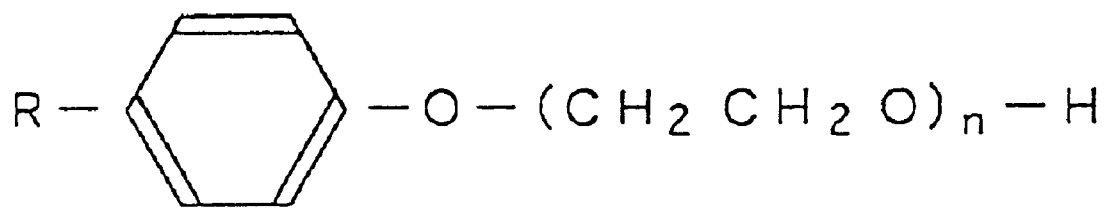
FIG. 4A and 4B respectively show the molecular formula of alkylaryl ether which is adopted as an example of the tackifier or a binder, and the molecular formula of alkyl ether which is adopted as another example of the tackifier or the binder.
Figure 4B:
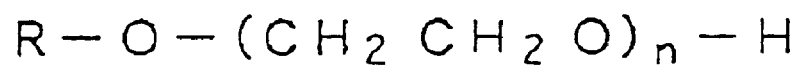

FIGS. 4A and 4B respectively show components of the above organic polymer materials. Incidentally, the term "alkylaryl ether" in this specification signifies an organic polymer material which is expressed by the molecular formula shown in FIG. 4A, and the term "alkyl ether" signifies a material which is expressed by the molecular formula shown in FIG. 4B of this figure.

The alkylaryl ether whose value "m" indicated in FIG. 4A is 8 through 12 includes, for example, octyl, nonyl and lauryl. In this regard, the alkylaryl ether whose value "m" is less than 8 is susceptible to oxidation and decomposition. Further, the alkylaryl ether whose value "m" is greater than 12 exhibits inferior solubility in water. Therefore both of these materials are difficult to use as the tackifier or the binder.

On the other hand, the alkyl ether whose value "m" indicated in FIG. 4B is 12 thru 18 includes, for example, lauryl, tridecyl, cetyl, stearyl and oleyl. In this regard, the alkyl ether whose value "m" is less than 12 is susceptible to oxidation and decomposition. Further, the alkyl ether whose value "m" is greater than 18 exhibits inferior solubility in water. Therefore, both these materials are difficult to use as the tackifier or the binder.

Moreover, in the alkylaryl ether or the alkyl ether, a value "n" indicated in FIGS. 4A or 4B should preferably be at least 10. Considering the oxidation resistance of the material, the value "n" should more preferably be at least, 15.

What is claimed is:

1. A sealed nickel/metal hydride battery comprising a hydrogen-storage alloy electrode in which a paste formed by mixing the powder of a hydrogen-storage alloy with a tackifier and water is deposited on a metallic collector member, said electrode being immersed in an alkaline electrolyte within a sealing case;

said tackifier being formed from a raw material which is a nonionic and water-soluble organic polymer material containing an ether linkage.

2. A sealed nickel/metal hydride battery comprising a hydrogen-storage alloy electrode in which a paste formed by mixing the powder of a hydrogen-storage alloy with a binder and water is deposited on a metallic collector member, said electrode being immersed in an alkaline electrolyte within a sealing case;

said binder being formed from a raw material which is a nonionic and water-soluble organic polymer material containing an ether linkage.

3. A sealed nickel/metal hydride battery as defined in claim 1, wherein said metallic collector member is foamed-nickel.

4. A sealed nickel/metal hydride battery as defined in claim 2, wherein said metallic collector member is foamed-nickel.

5. An electrode for a sealed nickel/metal hydride battery fabricated by immersing in an alkaline electrolyte a hydrogen-storage alloy electrode in which a paste formed by mixing the powder of a hydrogen-storage alloy with a tackifier and water is deposited on a metallic collector member and which is enclosed in a sealing case;

wherein said tackifier is formed from a raw material which is a nonionic and water-soluble organic polymer material selected from the group consisting of alkylaryl ether, alkyl ether, and a copolymer of said ethers.

6. An electrode for a sealed nickel/metal hydride battery fabricated by immersing in an alkaline electrolyte a hydrogen-storage alloy electrode in which a paste formed by mixing the powder of a hydrogen-storage alloy with a binder and water is deposited on a metallic collector member and which is enclosed in a sealing case;

wherein said binder is formed from a raw material which is a nonionic and water-soluble organic polymer material selected from the group consisting of alkylaryl ether, alkyl ether, and a copolymer of said ethers.

7. A sealed nickel/metal hydride battery as defined in claim 1, wherein said tackifier contains as its principal component a material which is selected from the group consisting of polyethylene oxide, polypropylene oxide, polybutylene oxide, and a copolymer of at least two of said oxides.

8. A sealed nickel/metal hydride battery as defined in claim 2, wherein said binder contains as its principal component a material which is selected from the group consisting of polyethylene oxide, polypropylene oxide, polybutylene oxide, and a copolymer of at least two of said oxides.

9. A sealed nickel/metal hydride battery as defined in claim 1, wherein said organic polymer material has a degree of polymerization of 5000 or more.

10. A sealed nickel/metal hydride battery as defined in claim 2, wherein said organic polymer material has a degree of polymerization of 5000 or more.

11. An electrode for a sealed nickel/metal hydride battery as defined in claim 5, wherein the alkyl group in the alkyl ether contains from 12 to 18 carbon atoms.

12. An electrode for a sealed nickel/metal hydride battery as defined in claim 6, wherein the alkyl group in the alkyl ether contains from 12 to 18 carbon atoms.

13. An electrode for a sealed nickel/metal hydride battery as defined in claim 5, wherein alkyl group in the alkylaryl ether contains from 12 to 18 carbon atoms.

14. An electrode for a sealed nickel/metal hydride battery as defined in claim 6, wherein the alkyl group in the alkylaryl ether contains from 12 to 18 carbon atoms.

15. An electrode for a sealed nickel/metal hydride battery as defined in claim 5, wherein the alkyl ether has the formula $R-O-(CH_2-CH_2-O)_n-H$, wherein R is an alkyl group and n is at least 10.

16. An electrode for a sealed nickel/metal hydride battery as defined in claim 6, wherein the alkyl ether has the formula $R-O-(CH_2-CH_2-O)_n-H$, wherein R is an alkyl group and n is at least 10.

17. An electrode for a sealed nickel/metal hydride battery as defined in claim 5, wherein the alkylaryl ether has the formula $R-Ar-O-(CH_2-CH_2-O)_n-H$, wherein R is an alkyl group, Ar is an aryl group, and n is at least 10.

18. An electrode for a sealed nickel/metal hydride battery as defined in claim 6, wherein the alkylaryl ether has the formula $R-Ar-O-(CH_2-CH_2-O)_n-H$, wherein R is an alkyl group, Ar is an aryl group, and n is at least 10.

19. A sealed nickel/metal hydride battery comprising a nickel hydroxide positive electrode fabricated by packing into a foamed nickel collector member an aqueous solution of a tackifier and nickel hydroxide;

said tackifier being formed from a raw material which is a nonionic and water-soluble organic polymer material containing an ether linkage.

* * * * *

UNITED STATES PATENT AND TRADEMARK OFFICE
CERTIFICATE OF CORRECTION

PATENT NO. : 5,948,563
DATED : September 7, 1999
INVENTOR(S) : H. Kawase, et. al.

It is certified that error appears in the above-identified patent and that said Letters Patent is hereby corrected as shown below:

Title page, item [54], in the title and col. 1, should read as follow:

SEALED NICKEL/METAL HYDRIDE BATTERY AND HYDROGEN-STORAGE ALLOY ELECTRODE FOR USE IN SAME.

Signed and Sealed this

Fifth Day of December, 2000

Attest:

Attesting Officer

Q. TODD DICKINSON

Director of Patents and Trademarks